United States Patent
Smith et al.

(10) Patent No.: US 6,425,078 B1
(45) Date of Patent: Jul. 23, 2002

(54) METHOD FOR FACTORY-INSTALLATION OF FILES AND DIRECTORIES WITH LONG FILENAMES WHILE MAINTAINING PROPER REFERENCE TO THEIR SHORT FILENAME EQUIVALENTS

(75) Inventors: T. Gavin Smith, Pflugerville; David T. Valys; James Patrick McGlothlin, both of Austin, all of TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/385,780

(22) Filed: Aug. 30, 1999

(51) Int. Cl.[7] .............................. G06F 9/00; G06F 9/445
(52) U.S. Cl. .............................. 713/1; 707/1; 707/100; 717/174
(58) Field of Search .................. 713/1, 100; 709/200, 709/203, 218; 717/137, 174–178; 707/1, 10, 100, 200

(56) References Cited

U.S. PATENT DOCUMENTS

| | | | | |
|---|---|---|---|---|
| 5,247,683 A | | 9/1993 | Holmes et al. ............ 395/700 |
| 5,410,475 A | * | 4/1995 | Lu et al. ..................... 704/1 |
| 5,414,841 A | * | 5/1995 | Bingham et al. .......... 707/100 |
| 5,421,009 A | | 5/1995 | Platt ........................... 395/600 |
| 5,444,861 A | | 8/1995 | Adamec et al. ........... 395/700 |
| 5,579,517 A | * | 11/1996 | Reynolds et al. ......... 707/200 |
| 5,715,456 A | | 2/1998 | Bennett et al. ............ 395/652 |
| 5,745,888 A | * | 4/1998 | Bauer et al. ............... 707/1 |
| 5,748,575 A | | 5/1998 | Lee .............................. 369/30 |
| 5,794,052 A | | 8/1998 | Harding ...................... 395/712 |
| 5,799,307 A | * | 8/1998 | Buitron ...................... 707/100 |
| 5,802,297 A | | 9/1998 | Engquist .................. 395/200.45 |
| 5,805,897 A | | 9/1998 | Glowny ...................... 395/712 |
| 5,835,777 A | | 11/1998 | Staelin ........................ 395/712 |
| 5,842,024 A | | 11/1998 | Choye et al. ............... 395/712 |
| 6,006,031 A | * | 12/1999 | Andrews et al. ............ 717/137 |
| 6,012,102 A | * | 1/2000 | Shachar ........................ 710/5 |

* cited by examiner

Primary Examiner—Thomas Lee
Assistant Examiner—Thuan Du
(74) Attorney, Agent, or Firm—Haynes and Boone, LLP

(57) ABSTRACT

Method and apparatus for factory-installing directories with long filenames while maintaining proper references to the short filename equivalents thereof are described. During a development stage, a determination is made whether any files or directories with long filenames were created by an application installed on a development system for developing an installation package for the application. If so, the development system is queried for the short filenames associated with these long filenames. The development system then creates a factory-install package for the application in which all short filename references to these long filename files and directories are programmatically replaced with tokens that are unique to each long filename. The factory-install package is then uploaded to a factory server. Subsequently, during a factory-installation stage, the factory-install package is downloaded to a built-to-order ("BTO") system and, as the package is installed on the BTO system, the instances of all tokens are dynamically replaced with the equivalent short filenames.

28 Claims, 1 Drawing Sheet

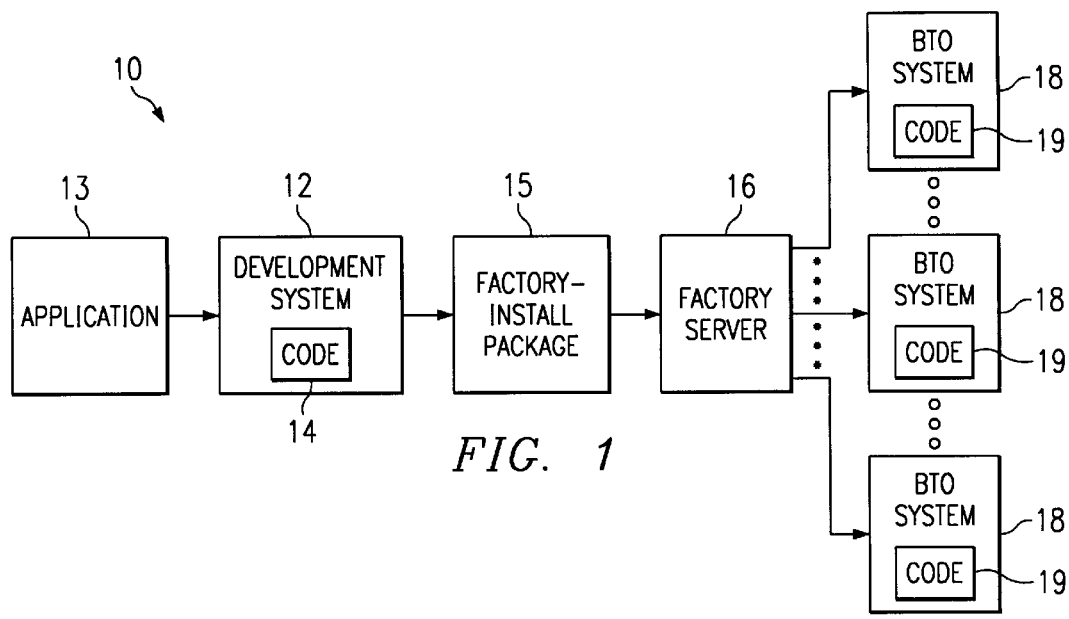
FIG. 1
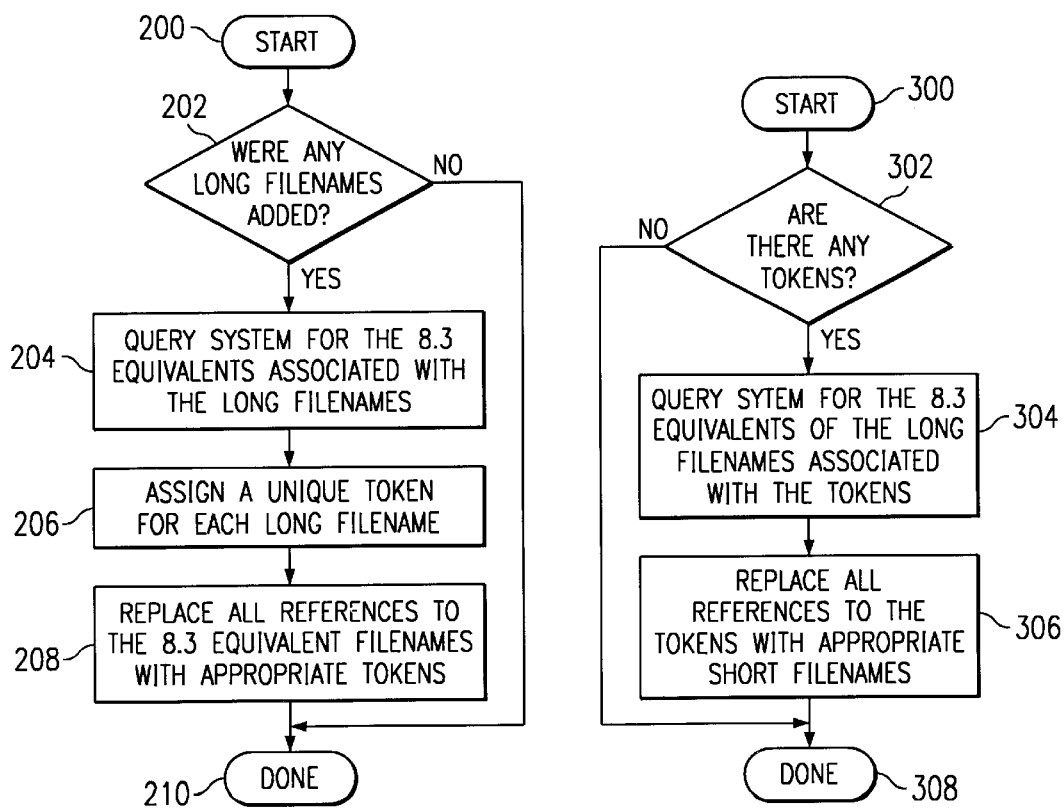
FIG. 2
FIG. 3

METHOD FOR FACTORY-INSTALLATION OF FILES AND DIRECTORIES WITH LONG FILENAMES WHILE MAINTAINING PROPER REFERENCE TO THEIR SHORT FILENAME EQUIVALENTS

CROSS-REFERENCE TO RELATED APPLICATIONS

This application relates to U.S. patent application Ser. No. 09/236,862, now U.S. Pat. No. 6,247,126, filed on Jan, 25, 1999, entitled RECOVERABLE SOFTWARE INSTALLATION PROCESS AND APPARATUS FOR A COMPUTER SYSTEM naming Alan E. Beelitz and Richard D. Amberg as inventors. The co-pending application is incorporated herein by reference in its entirety, and is assigned to the assignee of this invention.

This application relates to co-pending U.S. patent application Ser. No. 09/315,657, still pending, filed on May 20, 1999, entitled METHOD AND APPARATUS FOR WINDOWS-BASED INSTALLATION, FOR INSTANCE SOFTWARE ON BUILD-TO-ORDER COMPUTER SYSTEMS naming Bobby G. Doran, Bill Hyden and Terry Wayne Liles as inventors. The co-pending application is incorporated herein by reference in its entirety, and is assigned to the assignee of this invention.

BACKGROUND

The disclosures herein relate generally to factory-installation of software and, more particularly, to a method of factory-installing files and directories with long filenames while maintaining proper references to the short filename equivalents thereof.

For legacy support with operating systems and applications that do not support long filenames for directories and files, Windows 95 assigns 8.3 equivalent "short" filenames that are unique within a given path to each long filename on the system. This applies to both files and directories that have long filenames. For example, the short filename of "Microsoft Internet Explorer" would be "MICROS~1" if it was the first "Microsoft_" file or directory created under a given path. The short filename of the next "Microsoft_" file or directory created under that path would be "MICROS~2", then "MICROS~3", and so on. These short filenames are determined by the order in which their associated long filenames were created and cannot be set arbitrarily. This order-dependence is problematic when a system state change utility is used to create the factory-install package. A system state change utility works by capturing the changes an application makes to the system and then applying those changes back to another system to install the application.

Generally, each factory-install package is created independently, meaning that a Microsoft Internet Explorer package will be created on a system on which Microsoft Office is not already installed and vice-versa. This leaves open the possibility that, under a given path, the Microsoft Internet Explorer package could contain a "Microsoft Internet Explorer" directory with the short filename of "MICROS~1", and the Microsoft Office package could contain a "Microsoft Office" directory with the same "MICROS~1" short filename. This in itself is not a problem because, when the packages are installed on the same system, the system will generate new short filenames for these long filename files and directories depending on the order in which they were created.

The problem is that some applications contain references in the registry or filesystem to short filenames. If a system state change utility is used to create a factory-install package of such an application, these references become static; that is, they point to the short filenames generated on the development system rather than to the short filenames generated dynamically during the factory-install. For a computer manufacturer that builds systems to order, Microsoft Office and Microsoft Internet Explorer can and are installed on a single system, but only one file or directory in a given path can truly be associated with the short name "MICROS~1". This results in a situation where Microsoft Office has registry entries containing "MICROS~1" that inadvertently reference Microsoft Internet Explorer. This problem can arise any time similar long file or directory names are used within the same path. For example, the above-described problem will arise in connection with "C:\Program Files\Norton AntiVirus" and "C:\Program Files\Norton Utilities" as well.

There are currently several approaches used to address this problem. For example, in some cases, one application will create two (or more) similar long filename directories under a given path that cannot be modified using the aforementioned method. In this case, the application can be broken into multiple pieces that can be installed in the appropriate order to ensure the proper long filename/short filename associations.

Another solution involves replacing the short filename reference with the long filename. This is not always possible, however, and requires human intervention to attempt to determine what other modifications to the registry key need to be made. Yet another solution is to factory-install software to non-default directories when the default long filenames would cause problems. Microsoft Office is installed to "MSOffice" instead of "Microsoft Office". Some applications, such as Microsoft Internet Explorer, do not allow the installation directory to be changed, so there is no method currently to avoid this problem in those cases.

Therefore, what is needed is a method for factory-installing files and directories with long filenames while maintaining proper references to their short filename equivalents.

SUMMARY

One embodiment, accordingly, provides a method and apparatus for factory-installing directories with long filenames while maintaining proper references to the short filename equivalents thereof. During a development stage, a determination is made whether any files or directories with long filenames were created by an application installed on a development system for developing an installation package for the application. If so, the development system is queried for the short filenames associated with these long filenames. The development system then creates a factory-install package for the application in which all short filename references to these long filename files and directories are programmatically replaced with tokens that are unique to each long filename.

A principal advantage of this embodiment is that it can be used in connection with applications, such as Microsoft Internet Explorer, that do not allow the installation directory to be changed. In addition, it works in cases in which the short filename reference cannot be replaced with the long filename and does not require human intervention to determine what other modifications to the registry key need to be made.

BRIEF DESCRIPTION OF THE DRAWING FIGURES

FIG. 1 illustrates an environment for implementing an embodiment.

FIG. 2 is a flowchart of a method of implementing a development stage of the embodiment or FIG. 1.

FIG. 3 is a flowchart of a method of implementing a factory-installation stage of the embodiment of FIG. 1.

DETAILED DESCRIPTION

FIG. 1 is an illustration of an environment 10 for implementing an embodiment described herein. The environment 10 includes a system 12 having a basic operating system ("OS") installed thereon for use in developing applications and drivers to be preinstalled on built-to-order ("BTO") computer systems. In particular, according to one embodiment, during a development stage, a "snapshot" is taken of the files and registry settings of the system 12 with the basic OS installed thereon. Next, an application 13 to be preinstalled on a built-to-order PC, such as Microsoft Office, is installed on the system 12 and another snapshot is taken of the files and registry settings of the system. The difference between the two snapshots is the basic factory-install package for the application 13.

As will be described in greater detail with reference to FIG. 2, in accordance with the embodiment described herein, at this point, code 14 is executed by the system 12 to cause the system 12 to replace all short filename references in the basic factory-install package with tokens to create a modified factory-install package 15, which is uploaded to a factory server 16 where it is identified by a part number corresponding to the application 13. It will be recognized that separate modified factory-install packages will be created for each application to be preinstalled on one or more BTO computer systems, with each individual package being identified by a part number corresponding to the application.

During a factory-installation stage, responsive to a command from one or more BTO computer systems 18 to the factory server 16 to install a selected application, e.g., the application 13, identified by part number, the modified factory-install package corresponding to the selected application, in this case, the package 15, is downloaded from the server to one or more BTO computer systems 18 onto which the application is to be preinstalled. As will be described in greater detail in FIG. 3, in accordance with the embodiment described herein, during installation of the application 13 onto one of the BTO computer systems 18 using the package 15, code 19 stored on each of the BTO computer systems 18 causes the tokens to be replaced with the proper short filename references.

FIG. 2 is a flowchart of a method of implementing the development stage of the embodiment described herein. It will be recognized that the method shown in and described with reference to FIG. 2 is embodied in the code 14. The development stage begins in step 200. In step 202, a determination is made whether any long filenames, e.g., "C:\Microsoft Office", were added to the filesystem of the development system 12. If so, execution proceeds to step 204, in which the development system 12 is queried for the 8.3 equivalent filenames associated with the long filenames. In the previous example, the 8.3 equivalent filename associated with the long filename "C:\Microsoft Office" would be "C:\MICROS~1". In step 206, a unique token is assigned for each long filename. Again, using the previous example, a token "@$$@TOKEN001@$$@" would be assigned for the long filename "C:\Microsoft Office". In step 208, all references to the 8.3 equivalent filenames are replaced with the assigned tokens. For example, in the Windows registry, HKLM\Software\Microsoft\Ofc2000\Installpath="C:\MICROS~1\"

would be replaced with

HKLM\Software\Microsoft\Ofc2000\Installpath="@$$@TOKEN001@$$@".

The development stage terminates in step 210.

Similarly, if in step 202 it is determined that no long filenames were added, execution proceeds directly to step 210.

FIG. 3 is a flowchart of a method of implementing the factory-installation stage of the embodiment described herein. It will be recognized that the method shown in and described with reference to FIG. 3 is embodied in the code 19. The factory-installation stage begins in step 300. In step 302, a determination is made whether there are any tokens in the factory-install package 15, e.g., "@$$TOKEN001@$$@". If so, execution proceeds to step 304, in which the BTO computer system 18 is queried for the 8.3 equivalent of the long filenames associated with the tokens. In this case, the 8.3 equivalent of the long filename "C:\Microsoft Office" could be "C:\MICROS~2". In step 306, all references to each of the tokens are replaced with the appropriate short filenames. For example, in the Windows registry, HKLM\Software\Microsoft\Ofc2000\Installpath="@$$@TOKEN001@$$@"

would be replaced with

HKLM\Software\Microsoft\Ofc2000\Installpath="C:\MICROS~2".

The development stage terminates in step 308.

Accordingly, a method and system for factory-installation of files and directories with long filenames while maintaining proper reference to their short filename equivalents as shown and described herein overcome the deficiencies of the prior art as described above.

Although an illustrative embodiment has been shown and described, other modifications, changes, and substitutions are intended in the foregoing disclosure. Accordingly, it is appropriate that the appended claims be construed broadly and in a manner consistent with the scope of the disclosure.

What is claimed is:

1. A method of factory-installing on a built-to-order ("BTO") computer system files and directories with long filenames while maintaining proper reference to the short filename equivalents thereof, the method comprising the steps of:

during a factory-install package development stage for an application:
developing a basic factory-install package for the application using a development system;
determining whether the basic factory-install package includes any long filenames;
responsive to a determination that the basic factory-install package includes long filenames, for each of the long filenames included:
determining a short filename equivalent associated with the long filename;
assigning a unique token for the long filename; and
replacing all references to the short filename equivalent associated with the unique token for the long filename to create a modified factory-install package for the application.

2. The method of claim 1 further comprising the step of downloading the modified factory-install package to a server electrically connected to the development system and the BTO computer system.

3. The method of claim 2 further comprising the steps of, during a factory-installation stage:
    downloading the modified factory-install package for the application from the server to the BTO computer system;
    installing the application on the BTO computer system using the modified factory-install package for the application;
    determining whether there are any tokens on the BTO computer system; and
    responsive to a determination that there are any tokens on the BTO computer system, for each token:
        determining short filename equivalent of the long filename associated with the token; and
        replacing all references to the token with the short filename equivalent of the long filename associated with the token.

4. The method of claim 1 wherein the determining a short filename equivalent associated with the long filename comprises querying the development system for the short filename equivalent associated with the long filename.

5. The method of claim 3 wherein the determining short filename equivalent of the long filename associated with the token comprises querying the BTO computer system for the short filename equivalent of the long filename associated with the token.

6. The method of claim 3 wherein the downloading the modified factory-install package for the application from the server to the BTO computer system is performed responsive to an external instruction to the server to install the application on the BTO computer system.

7. The method of claim 1 further comprising the step of downloading the modified factory-install package to a server electrically connected to the development system and a plurality of BTO computer systems.

8. The method of claim 7 further comprising the steps of, during a factory-installation stage:
    the server receiving an instruction to install the application on a selected one of the BTO computer systems;
    downloading the modified factory-install package for the application from the server to the selected one of the BTO computer systems;
    installing the application on the selected one of the BTO computer systems using the modified factory-install package for the application;
    determining whether there are any tokens on the selected one of the BTO computer systems; and
    responsive to a determination that there are any tokens on the selected one of the BTO computer systems, for each token:
        determining short filename equivalent of the long filename associated with the token; and
        replacing all references to the token with the short filename equivalent of the long filename associated with the token.

9. The method of claim 8 wherein the determining short filename equivalent of the long filename associated with the token comprises querying the selected one of the BTO computer systems for the short filename equivalent of the long filename associated with the token.

10. The method of claim 8 wherein the downloading the modified factory-install package for the application from the server to the selected one of the BTO computer systems is performed responsive to an external instruction to the server to install the application on the selected one of the BTO computer systems.

11. A system for factory-installing on a built-to-order ("BTO") computer system files and directories with long filenames while maintaining proper reference to the short filename equivalents thereof, the system comprising:
    means for developing a basic factory-install package for the application using a development system;
    means for determining whether the basic factory-install package includes any long filenames; and
    means responsive to a determination that the basic factory-install package includes long filenames for, for each of the long filenames included, determining a short filename equivalent associated with the long filename, assigning a unique token for the long filename, and replacing all references to the short filename equivalent associated with the unique token for the long filename to create a modified factory-install package for the application.

12. The system of claim 11 further comprising means for downloading the modified factory-install package to a server electrically connected to the development system and the BTO computer system.

13. The system of claim 12 further comprising:
    means for downloading the modified factory-install package for the application from the server to the BTO computer system;
    means for installing the application on the BTO computer system using the modified factory-install package for the application;
    means for determining whether there are any tokens on the BTO computer system; and
    means responsive to a determination that there are any tokens on the BTO computer system for, for each token, determining the short filename equivalent of the long filename associated with the token, and replacing all references to the token with the short filename equivalent of the long filename associated with the token.

14. The system of claim 11 wherein the means for determining a short filename equivalent associated with the long filename comprises means for querying the development system for the short filename equivalent associated with the long filename.

15. The system of claim 13 wherein the means for determining short filename equivalent of the long filename associated with the token comprises means for querying the BTO computer system for the short filename equivalent of the long filename associated with the token.

16. The system of claim 13 wherein the downloading the modified factory-install package for the application from the server to the BTO computer system is performed responsive to an external instruction to the server to install the application on the BTO computer system.

17. A system for factory-installing on a built-to-order ("BTO") computer system files and directories with long filenames while maintaining proper reference to the short filename equivalents thereof, the system comprising:
    a development system for developing a basic factory-install package for an application;
    a factory server electrically connected to the development system;
    a BTO computer electrically connected to the factory server; and
    the development system further including computer language instructions executable by the development system for, for each long filename created by the application, determining a short filename equivalent associated therewith, assigning a unique token for the long filename, and replacing all references to the short filename equivalent associated with the unique token for the long filename to create a modified factory-install package for the application.

18. The system of claim 17 wherein the modified factory-install package is downloaded to the factory server.

19. The system of claim 18 wherein responsive to an instruction to install the application on the BTO computer system, the modified factory-install package for the application is downloaded from the factory server to the BTO computer system and the application is installed on the BTO computer system using the modified factory-install package.

20. The system of claim 19 wherein the BTO computer system includes computer language instructions executable by the BTO computer system for determining whether there are any tokens on the BTO computer system and, if so, for each token, determining the short filename equivalent of the long filename associated with the token and replacing all references to the token with the short filename equivalent of the long filename associated with the token.

21. The system of claim 17 wherein the determining a short filename equivalent associated with the long filename comprises querying the development system for the short filename equivalent associated with the long filename.

22. The system of claim 20 wherein the determining short filename equivalent of the long filename associated with the token comprises querying the BTO computer system for the short filename equivalent of the long filename associated with the token.

23. A system for factory-installing on a built-to-order ("BTO") computer system files and directories with long filenames while maintaining proper reference to the short filename equivalents thereof, the system comprising:

a development system for developing a basic factory-install package for each of a plurality of applications;

a factory server electrically connected to the development system;

a plurality of BTO computer systems electrically connected to the factory server; and the development system further including computer language instructions executable by the development system for, for each long filename created by each application, determining a short filename equivalent associated therewith, assigning a unique token for the long filename, and replacing all references to the short filename equivalent associated with the unique token for the long filename to create a modified factory-install package for each application.

24. The system of claim 23 wherein the modified factory-install packages are downloaded to the factory server.

25. The system of claim 24 wherein responsive to an instruction to install a selected one of the applications on a selected one of the BTO computer systems, the modified factory-install package for the selected one of the applications is downloaded from the factory server to the selected one of the BTO computer systems and the selected one of the applications is installed on the selected one of the BTO computer systems using the modified factory-install package therefor.

26. The system of claim 25 wherein the selected one of the BTO computer systems includes computer language instructions executable by the selected one of the BTO computer systems for determining whether there are any tokens on the selected one of the BTO computer systems and, if so, for each token, determining the short filename equivalent of the long filename associated with the token and replacing all references to the token with the short filename equivalent of the long filename associated with the token.

27. The system of claim 23 wherein the determining a short filename equivalent associated with the long filename comprises querying the development system for the short filename equivalent associated with the long filename.

28. The system of claim 26 wherein the determining short filename equivalent of the long filename associated with the token comprises querying the selected one of the BTO computer systems for the short filename equivalent of the long filename associated with the token.

* * * * *